United States Patent [19]

Byers et al.

[11] Patent Number: 4,908,577
[45] Date of Patent: Mar. 13, 1990

[54] SYSTEM FOR MONITORING THE GAP BETWEEN, AND RELATIVE POSITION OF, RELATIVELY MOVABLE ELEMENTS

[75] Inventors: William N. Byers, Seattle; Richard G. Gilliland, Redmond, both of Wash.

[73] Assignee: The Boeing Company, Seattle, Wash.

[21] Appl. No.: 217,627

[22] Filed: Jul. 11, 1988

[51] Int. Cl.$^4$ .................. G01B 7/14; G01N 27/72; G01R 33/00; B60L 13/06
[52] U.S. Cl. .................. 324/207.20; 324/226; 104/284
[58] Field of Search ............... 324/207, 208, 257, 226, 324/227; 338/32 H; 307/309; 104/284

[56] References Cited

U.S. PATENT DOCUMENTS

| | | |
|---|---|---|
| 2,536,805 | 2/1951 | Hansen, Jr. |
| 2,784,851 | 3/1957 | Bretschneider |
| 2,987,669 | 6/1961 | Kallmann |
| 3,199,630 | 8/1965 | Engel et al. |
| 3,359,492 | 12/1967 | Kuhrt et al. |
| 3,419,798 | 12/1968 | Walton |
| 3,473,109 | 10/1969 | Maaz et al. |
| 3,800,708 | 4/1974 | English et al. |
| 3,849,724 | 11/1974 | Ghibu et al. ............... 324/207 |

Primary Examiner—Reinhard J. Eisenzopf
Assistant Examiner—Walter E. Snow
Attorney, Agent, or Firm—Christensen, O'Connor, Johnson & Kindness

[57] ABSTRACT

In accordance with this invention, a noncontacting sensing system (12) is disclosed for providing information regarding the gap between, and relative position of, two relatively movable elements such as a vehicle (14) and a guideway 16. As its main component, the system (12) includes an array (64) of four sensor assemblies (66). Each assembly (66) defines a target magnetic loop (T), which includes adjacent discrete pole pieces (28) in the guideway (16), and a separate reference magnetic loop (R). Hall-effect pickups (84) employed in the two loops (T and R) provide information regarding the relative magnetic intensity in the loops. A microprocessor (109) divides the output of the target loop pickups (88, 90, 92, and 94) by that of the reference loop pickup (96), in accordance with instructions provided in a read-only memory (ROM)(106). As a result, a corrected signal is produced for each assembly (66) independent of time-varying factors of the assembly (66). Microprocessor (104) further monitors these corrected signals by, for example, comparing the signals produced by all four assemblies (66). The maximum signal is representative of gap length, determined by reference to calibration data stored in ROM (106). The analysis of historical patterns in the corrected signals further allows the relative position of the vehicle (14) and guideway (16) to be determined. With an appropriate suspension and propulsion system (18) employed, a control system (20) responds to the output of system (12) by adjusting a variety of factors of vehicle performance including, for example, gap, position, speed, acceleration, pitch, and roll.

11 Claims, 4 Drawing Sheets

SYSTEM FOR MONITORING THE GAP BETWEEN, AND RELATIVE POSITION OF, RELATIVELY MOVABLE ELEMENTS

This invention was made with government support under Contract Number DOT-UT-80041 awarded by the United States Department of Transportation. The Government has certain rights in this invention.

FIELD OF THE INVENTION

This invention relates generally to sensing systems and, more particularly, to sensing systems for monitoring both the gap between two noncontacting elements and the relative position of the two elements.

BACKGROUND OF THE INVENTION

Many devices and systems employ moving components that are supported in noncontacting relationship with respect to each other. Such an arrangement is particularly advantageous where the frictional force between the components is to be minimized. Without a mechanical connection between the components, however, some form of nonmechanical sensor must be provided if information concerning the gap between, and relative position of, the components is to be produced.

Turning to one example of particular interest, some transportation systems employ noncontacting elements to enhance system speed, safety, and efficiency. Specifically, such transportation systems involve the suspension of a vehicle above or below a roadway along which the vehicle is propelled. By eliminating frictional force between the vehicle and roadway, energy losses are reduced, as are system maintenance requirements. In addition, because the vehicle is not mechanically coupled to the roadway, surface conditions attributable to factors such as weather will not affect vehicle performance, enhancing system safety and resulting in more consistent vehicle ride characteristics.

The controlled suspension of the vehicle with respect to the roadway is often achieved through the use of magnetic force. For example, the magnetic repulsion or attraction between magnets located on both the roadway and the vehicle can be used for suspension. Alternatively, the attractive force between magnets and a magnetically permeable material, such as iron, placed in an opposing relationship in the vehicle and roadway, can be used to eliminate contact therebetween. For convenience, systems employing magnetic suspension also typically employ any of a variety of magnetic motor arrangements to propel the vehicle along the roadway.

As will be appreciated, the control of such transportation systems requires information regarding both the "gap" between the vehicle and roadway (e.g., the spacing between the vehicle and roadway measured in a direction normal to the path of the vehicle's travel) and the "relative position" of the vehicle with respect to the roadway (e.g., the position of the vehicle relative to the roadway measured in a direction parallel to the path of vehicle travel). For example, the length of the gap between the vehicle and roadway may affect the safety, operating characteristics, and efficiency of the transportation system. The gap length, however, is a function of a number of factors, including both the energy applied to the magnetic suspension system and the load applied to, and operation of, the vehicle. Thus, feedback concerning the influence of system operating conditions on gap length is helpful to maintain the desired separation between the vehicle and roadway.

Like gap length, information concerning the relative position of the vehicle with respect to the roadway is useful to maintain control of the transportation system. For example, this information identifies vehicle location, and, when combined with timing information, can be used to determine vehicle velocity and acceleration. Analysis of the position, velocity, and acceleration information can be used to provide feedback to the vehicle propulsion system to control each of these parameters of transportation system operation, as desired.

One prior art device used for performing measurements between noncontacting components is commonly referred to as a "Hall-effect" device or sensor. Such a device is made of a semiconducting material having characteristics that result in the production of an electric potential along a first axis when an electric current is applied along a second axis, normal to the first, and a magnetic field is applied along a third axis, normal to the first and second axis. While the resultant "Hall" potential is a function of a number of characteristics of the device, it is also proportional to the strength of both the applied electric current and magnetic field. As a result, if the characteristics of the device and the magnitude of the applied current are known, the Hall potential can be used to indicate the strength of the magnetic field applied.

Such Hall-effect devices have been used to measure various characteristics between noncontacting elements. For example, as shown in U.S. Pat. No. 3,419,798 (Walton), a pair of transducers employing Hall-effect devices are used to measure the varying gap between two objects that are relatively displaceable in a direction normal to the gap. Because the gap is a function of only the relative displacement of the two objects, measurement of the gap leads directly to an indication of displacement. Similarly, U.S. Pat. No. 2,987,669 (Kallmann) discloses several embodiments of a system employing the Hall-effect to monitor the motion of two elements in a direction normal to their fixed separating gap.

Such prior art Hall-effect arrangements conveniently allow either gap or relative displacement to be measured in systems where the unmeasured quantity is held constant. Alternatively, both gap and displacement can be determined if a fixed relationship is previously known to exist between the two variables. Prior art arrangements have not, however, been able to produce an output indicating both gap and relative displacement when both quantities vary in an unrelated manner.

As noted previously, information regarding both these variables is required for the proper operation of transportation systems employing, for example, magnetic suspension and propulsion to maintain a noncontacting relationship between the vehicle and roadway. In such systems, gap and displacement each vary in an unrelated manner. Further, because transportation systems of this type typically include roadways comprised in part of spaced-apart pole pieces, the "apparent" gap may abruptly alternate between relatively high and low levels as the sensing device alternatively traverses regions of the roadway having low and high magnetic permeabilities. In light of the preceding remarks, it would be desirable to provide a noncontacting sensing system that produces an output indicative of both gap and relative displacement, regardless of the manner in which these variables change.

A second problem not previously addressed by the art and of particular applicability to the use of Hall-effect devices, involves the variability of the Hall potential as a function of factors other than gap or relative position. For example, fluctuations in the operation of the source of the magnetic field, as well as variations in the temperature of the Hall device, may alter the device's output. Without some form of compensation, an erroneous determination of gap or relative position would occur. It would, therefore, be desirable to produce a sensing system employing a Hall-effect sensor whose potential is unaffected by such variables.

SUMMARY OF THE INVENTION

In accordance with this invention, a sensor is provided for use in monitoring the gap between, and relative position of, first and second elements. The first element defines a path of relative motion between the two elements and includes consecutive regions whose magnetic permeabilities are alternately equal to first and second levels. The sensor includes a sensor element that is securable to the second element to produce data having a magnitude that varies in part with the magnetic permeabilities of the regions of the first element adjacent the sensor element as the first and second elements undergo relative motion. The system also includes processing means for monitoring the data and producing an output indicative of the gap, based upon information obtained from the data produced when the region adjacent the sensor element has a magnetic permeability equivalent to the first level. An output indicative of the relative position is also produced, based upon information obtained from the data produced when consecutive ones of the regions are adjacent the sensor element.

In accordance with another aspect of this invention, a transportation system is provided for monitoring the gap between, and relative position of, a vehicle movable with respect to a reaction rail having a plurality of pole pieces of relatively high magnetic permeability separated by regions of relatively low magnetic permeability. The system includes a plurality of spaced-apart sensors provided on the vehicle for producing outputs indicative of a magnetic field intensity between the system and the rail. The sensors are appropriately spaced to ensure that at least one sensor is adjacent a pole for all relative positions of said vehicle and rail. The system also includes processing means that receives signal information from each sensor to monitor gap and produce an output indicative of longitudinal displacement by comparing information from sensors not adjacent a pole with information from sensors adjacent a pole.

In accordance with yet another aspect of this invention, a sensor is provided for monitoring the relationship between a first element and a second, magnetically permeable, element. At least one of the first and second elements is relatively displaceable with respect to the other and the sensor is attachable to the first element. The sensor includes a source of a magnetic field. A reference magnetic circuit including the source is provided and a Hall-effect device is positioned in the reference magnetic circuit to produce a reference electric potential in response to the magnetic field produced by the source. The source is also included in a target magnetic circuit, as is at least a portion of the second element. A second Hall-effect device, positioned in the target magnetic circuit, produces a measuring electric potential in response to the magnetic field produced by the source. A device for comparing the reference and target electric potentials produced by the first and second Hall-effect devices is included to produce an output indicative of the relative position of the first and second elements that is independent of the sensor variables.

BRIEF DESCRIPTION OF THE DRAWINGS

The invention will presently be described in greater detail, by way of example, with reference to the accompanying drawings, wherein.

DETAILED DESCRIPTION OF THE PREFERRED EMBODIMENT

Figure 1:
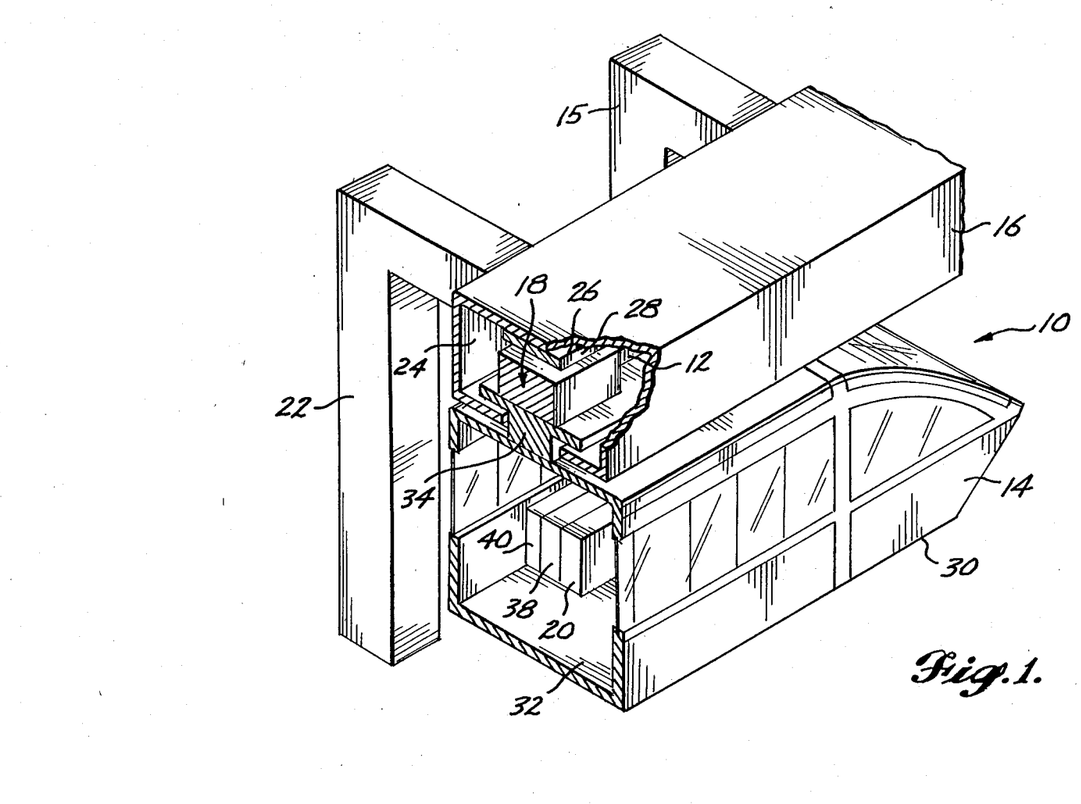
FIG. 1 is a pictorial view of a vehicle that is magnetically suspended from a roadway and that includes a sensing system constructed in accordance with the invention to measure both the gap between, and relative position of, the vehicle and roadway.

Referring now to FIG. 1, a transportation system 10 is shown. Transportation system 10 includes a noncontacting, gap- and position-sensing system 12, which detects the "gap" between, and "relative position" of, a vehicle 14 with respect to a guideway 16. As will be discussed in greater detail below, the "gap" between vehicle 14 and guideway 16 refers to the spacing between these components measured in a direction normal to the path of travel of vehicle 14. "Relative position" refers to the position of the vehicle 14 relative to guideway 16 and is measured, for example, in a direction parallel to the path of vehicle travel.

Also included on vehicle 14 is a suspension and propulsion system 18. System 18 both suspends vehicle 14 from guideway 16 and propels it along the guideway 16. While a variety of different constructions and arrangements of vehicle 14, guideway 16, and suspension and propulsion system 18 can be employed, in the preferred arrangement, system 18 is constructed to respond to instructions from a vehicle control system 20, which receives inputs from the sensing system 12.

Addressing now the various elements of system 10 in greater detail, as will be appreciated from FIG. 1, guideway 16 defines the path along which the vehicle 14 travels. In the arrangement shown, guideway 16 is supported above the ground by columns 22 and includes a recessed interior 24 for cooperatively receiving and retaining a portion of the vehicle 14 that contains the suspension and propulsion system 18. The guideway 16 is of a construction designed to ensure the safe support, guidance, and restraint of vehicle 14 in all events, including the failure of suspension and propulsion system 18.

Included in the recessed interior 24 of guideway 16 is a reaction rail 26. The reaction rail 26 includes a plurality of magnetically permeable, spaced-apart pole pieces 28, with which the suspension and propulsion system 18 interacts to suspend and propel vehicle 14.

Turning now to a discussion of the vehicle 14, as shown in FIG. 1, it includes a body 30 that defines a compartment 32 for receiving and transporting passengers, cargo, and equipment. A carrier 34, having a T-shaped cross section, extends longitudinally along the upper surface of the body 30 and is cooperatively received within the interior 24 of the guideway 16. The stator assembly 36 of a linear synchronous unipolar motor, included in suspension and propulsion system 18, extends longitudinally along the carrier 34, confronting the reaction rail 26 in a spaced-apart relationship. It is the spacing between stator assembly 36 and reaction rail 26 that defines the gap.

Also included on vehicle 14 as part of the suspension and propulsion system 18 is a polyphase, alternating current (AC) voltage source 38. Voltage source 38 supplies stator assembly 36 with the energy needed to propel vehicle 14 along guideway 16. Both the magnitude and frequency of the voltage output produced by source 38 can be varied to control propulsion as described below. A direct current (DC) power supply 40 also provides energy to stator assembly 36, altering the permanent magnetic field developed by stator assembly 36, which suspends vehicle 14 from guideway 16. As a result, by adjusting the output of supply 40, the gap between vehicle 14 and guideway 16 can be adjusted.

Briefly addressing the noncontacting sensing system 12, as will be discussed in greater detail below, system 12 is constructed to provide continuous information regarding both the gap between, and relative position of, vehicle 14 and guideway 16, even when the "apparent" gap between the sensing system 12 and reaction rail 26 undergoes sharp transitions due to the inclusion of discrete pole pieces 28 in reaction rail 26. The sensing system 12 further operates without mechanically coupling vehicle 14 and guideway 16, thereby avoiding the introduction of frictional losses into the operation of transportation system 10. Finally, sensing system 12 is designed to produce an output, indicative of gap and relative position, which is independent of system variables such as temperature and magnetic field source strength.

Turning briefly to the vehicle control system 20, as noted above, system 20 controls the operation of vehicle 14. Control system 20 receives both manual operator inputs and automatic system inputs, including information from the sensing system 12. Control system 20 processes the input information to produce outputs that are applied to the AC voltage source 38 and the DC power supply 40, resulting in the desired operation of suspension and propulsion system 18. More particularly, as discussed in greater detail below, with the appropriate input information available, control system 20 can adjust the gap between, and relative position of, vehicle 14 and guideway 16, as well as the speed, braking, yaw, pitch, and roll of vehicle 14.

Before discussing the operation of sensing system 12 and control system 20 in greater detail, a brief discussion of the preferred embodiment of suspension and propulsion system 18 is provided. A basic understanding of this embodiment, which includes a linear synchronous unipolar motor, provides an illustrative basis for the discussion of the manner in which sensing system 12 and control system 20 can be advantageously employed.

Figure 2:
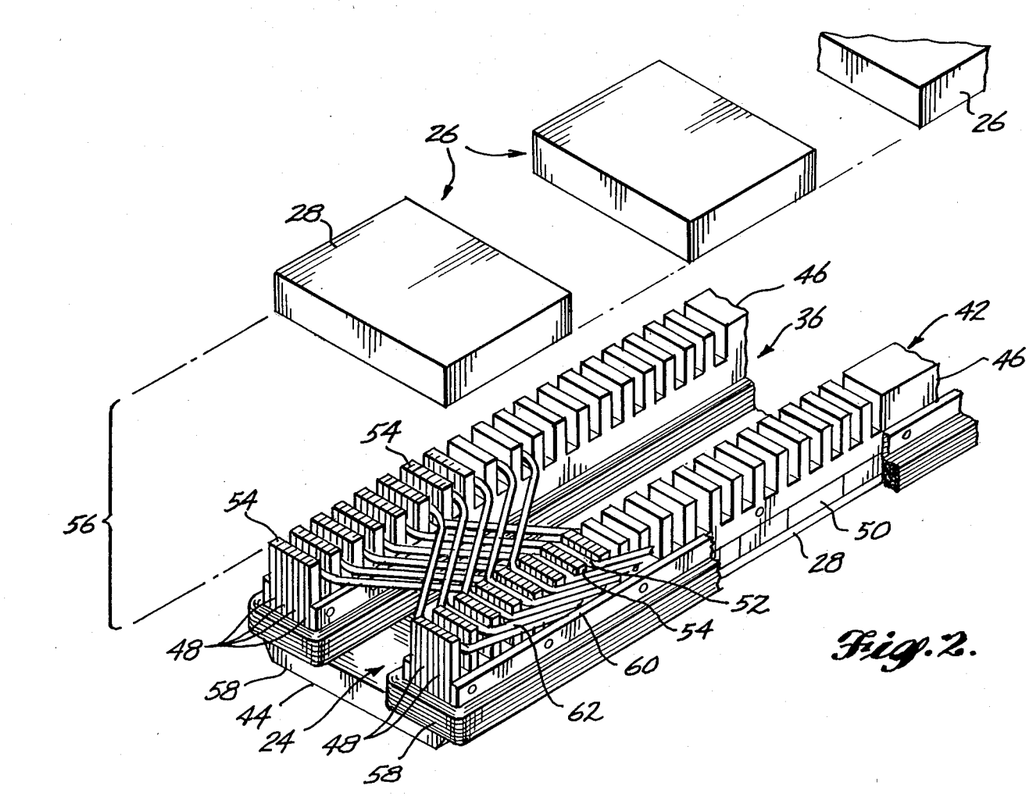
FIG. 2 is a pictorial view of a linear synchronous unipolar motor employed by the vehicle illustrated in FIG. 1 to suspend the vehicle from, and propel it along, a reaction rail included in the roadway.

Turning now to a description of one embodiment of a linear synchronous unipolar motor, as shown in FIG. 2, the stator assembly 36 of the motor includes a stator body 42 formed from a material having a high magnetic permeability and a U-shaped cross section. In the depicted arrangement, the stator body 42 includes a rectangular crossmember 44, such as a plate of iron. Extending orthogonally upward from each longitudinal edge of the crossmember 44 is a sidewall 46 that includes a plurality of relatively thin sheets 48 of iron, for example, and one or more "select" permanent magnets 50 interposed between sheets 48 and crossmember 44. Equally spaced-apart rectangular slots 52 extend orthogonally through the upper, laminated portion of each sidewall 46. In the preferred arrangement, stator body 42 includes two slots 52 per phase per pole, with the teeth 54 that are formed between slots 52 being dimensioned to achieve the desired magnetic saturation.

As noted above, stator assembly 36 includes one or more "select" permanent magnets 50 mounted in stator body 42. The select magnets 50 are characterized by their relatively high energy per unit volume (for example, greater than 20 megagauss-Oersted) and operate along a normal demagnetization curve that is substantially linear throughout its second quadrant. The linear nature of the demagnetization curve allows magnets 50 to be exposed to AC or DC magnetic fields without adversely affecting the flux output of the magnets 50 during repeated demagnetizing influences. At present, it appears that only certain rare-earth permanent magnets, for example, $Re_2Tm_{17}$, NdBFe, or $SmCo_5$, exhibit the desired characteristics.

In the arrangement of FIG. 2, the magnets 50 mounted in one sidewall 46 are positioned with their north magnetic poles directed toward the slots 52 of that sidewall 46, while in the other sidewall 46 all the magnetic south poles are directed toward slots 52. This establishes a magnetic field in the stator assembly 36, with the field's lines of magnetic flux extending through the U-shaped stator body 42 and across an air gap 56 formed between the upper face of sidewalls 46 and reaction rail 26. This magnetic field provides an attractive force between the reaction rail 26 and stator body 42, lifting and suspending vehicle 14.

To control the attractive force developed by permanent magnets 50, a DC field control coil 58 is wound longitudinally around each sidewall 46 of stator body 42 at a location encircling the permanent magnets 50. When energized by the DC power supply 40, field control coils 58 establish an electromagnetic field that follows the same flux path as the field established by the magnets 50. By varying the direction and magnitude of the DC current supplied to the field control coils 58 by supply 40, the magnetic field of the DC coils 58 either increases ("boosts") the magnetic field established by magnets 50, or decreases ("bucks") the magnetic field of the magnets 50. As the magnetic field is altered, the attraction force between the stator body 42 and reaction rail 26 will vary in inverse proportion to the square of the magnetic field strength established by permanent magnets 50 and DC coils 58.

Propulsion is accomplished by the linear synchronous unipolar motor with the aid of polyphase AC propulsion coils 60, which are uniformly arranged in the slots 52 of stator body 42. While coils 60 can be wound in a number of patterns to produce a moving wave of magnetic flux that continuously travels longitudinally along the stator body 42, in the embodiment shown in FIG. 2, the individual windings 62 of propulsion coil 60 form a three-phase, Y-connected winding that is arranged in a distributed, figure-eight configuration. The polyphase AC propulsion coils 60 cooperate with the reaction rail 26 and stator body 42 to propel vehicle 14 in the following manner.

When a polyphase AC voltage from source 38 is applied to the propulsion coil 60, a moving wave of magnetic flux is established by the propulsion coil 60. This moving wave of flux travels at a speed that is directly proportional to both the frequency of the voltage supplied by source 38 and the pole pitch of the motor. The thrust exerted by the moving wave of magnetic flux between the reaction rail 26 and the stator assembly 36 propels stator assembly 36 and, hence, vehicle 14 along the reaction rail 26 at a speed proportional to both the frequency of the polyphase AC voltage source 18 and the pole pitch. Shifting the phase of the signal supplied to each winding allows the motor to act as a generator, creating electrical energy during deceleration and performing braking and stopping functions for the system 10. As will be appreciated, the speed of the vehicle 14 can be controlled by varying the voltage and frequency of the polyphase AC voltage source 38, allowing both braking and acceleration to be achieved.

Figure 3:
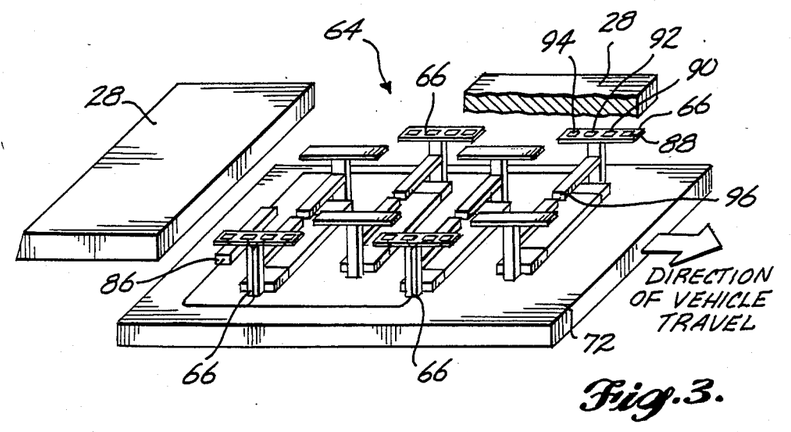
FIG. 3 is a pictorial view of a sensor array included in the vehicle sensing system to produce information from which the gap between, and relative position of, the vehicle and roadway can be determined.

Turning now to a discussion of the manner in which information regarding the gap between, and relative position of, vehicle 14 and guideway 16 is produced by system 12 and used by system 20 to control suspension and propulsion system 18, reference is had to FIG. 3. FIG. 3 illustrates an array 64 of individual sensor assemblies 66, which cooperatively sense gap and relative position. Specifically, as discussed in greater detail below, the sensor assemblies 66 rely upon the Hall-effect to monitor changes in the magnetic induction experienced between system 18 and reaction rail 26 as the vehicle 14 travels along guideway 16.

Figure 4:
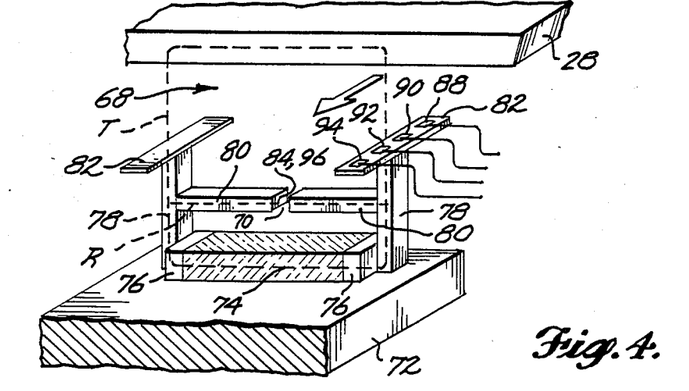
FIG. 4 is a more detailed pictorial view of one of the sensors shown in the array of FIG. 3.

Referring to FIG. 4 one of the four sensor assemblies 66 included in array 64 is illustrated. The function of each sensor assembly 66 is to establish a two-loop magnetic circuit, including a target loop and a reference loop. The target loop T is defined by a section of the sensor assembly 66, the closest pole piece 28 in reaction rail 26, and the target gap 68 therebetween. The reference loop R is also defined by a section of the sensor assembly 66 and includes a reference gap 70. As discussed below, a comparison of information concerning magnetic field intensity in the reference and target loops allows various construction and operating variables that might otherwise affect the output of the particular sensor assembly 66 to be compensated for. In addition, a comparison of information concerning magnetic field intensity in the target loops of the various sensor assemblies 66 allows gap and position to be precisely determined.

As shown in FIGS. 3 and 4, the individual sensor assemblies 66 are mounted on a common array baseplate 72. Baseplate 72 is formed of a material having a low magnetic permeability, substantially confining the lines of magnetic flux developed in the reference and target loops R and T to the individual sensor assemblies 66. As a result, the efficiency of each assembly 66 is improved, while the influence that the field of one assembly 66 might have on another is reduced.

If forward and aft arrays 64 are employed, the baseplates 72 are supportably positioned to project from the forward and aft ends of stator body 42. The baseplates 72 should extend parallel to the plane of the upper surface of teeth 54 and should further be positioned such that the upper surface of each assembly 66 lies below that plane.

As shown in FIG. 4, the primary source of the magnetic field employed by each sensor assembly 66 to establish the target and reference loops T and R is a permanent magnet 74. Permanent magnet 74 is of a bar-type construction having a north magnetic pole defined at one end and a south magnetic pole defined at the other. As will be appreciated, the dimensional characteristics of magnet 74, along with the magnetic material employed and its relative energy per unit volume, are selected to provide the desired magnetic field intensity at the various points throughout the reference and target loops. This magnetic field intensity, however, depends upon a variety of additional factors, including the reluctance of the various sections of the target and reference loops T and R. In the preferred arrangement, magnet 74 is made of cast Alnico V, has dimensions of $2.54 \times 2.54 \times 15.2$ centimeters and has a maximum energy per unit volume of 5.5 megagauss-Oersted.

Provided at each end of magnet 74 is an end cap 76 made of a material, such as iron, having a relatively high magnetic permeability. Each end cap 76 conveniently has a rectangular cross section corresponding to that of magnet 74 and is, for example, adhesively secured to the end of the magnet 74. The end caps 76 provide transition regions between magnet 74 and the remainder of the assembly 66 to reduce fringing effects at each end of magnet 74.

Projecting upward from the baseplate 72 at each end cap 76 is an upright arm 78. Like end cap 76, upright arm 78 is made of a magnetically permeable material such as iron and can be adhesively secured in place. For convenience, upright arms 78 are of a rectangular construction, which may be of a slightly smaller cross-sectional area than magnet 74 to increase the flux density in the arms 78.

Extending in opposed relationship between the upright arms 78 are a pair of horizontally disposed arms 80. More particularly, a base end of each arm 80 is secured adhesively to an inner face of the corresponding upright arm 78 approximately one-half way between the ends of the arm 78, in a T-shaped arrangement. The two horizontal arms 80 project toward each other in a longitudinal alignment and are separated at their innermost ends by the reference gap 70. Arms 80 are conveniently of the same rectangular cross section as upright arms 78 and the length of the two arms 80 is equal and sufficient to introduce the desired reference gap 70 into the reference magnetic loop R.

Secured to the upper end of each upright arm 78 is a pickup-mounting plate 82. Plates 82 are made of a material, such as iron, having a high magnetic permeability and may conveniently be secured in place by adhesive. The horizontally disposed pickup-mounting plates 82 preferably extend in a direction perpendicular to that of both the magnet 74 and horizontal arms 80.

As noted above, the sensor assembly 66 defines a reference magnetic circuit or loop R and, in cooperation with the pole pieces 28 of reaction rail 26, a target magnetic circuit or loop T. More particularly, the reference loop R is defined by permanent magnet 74, end cap 76, the lower portion of each upright arm 78, horizontal arms 80, and reference gap 70. As will be appreciated, the magnetic reluctance of this reference loop R is primarily attributable to the inclusion of the reference gap 70 and is a function of both the magnetic permeability of the air defining gap 70 and the length of the gap 70.

The target magnetic loop T is defined by permanent magnet 74, end cap 76, upright arms 78, pickup plates 82, target gaps 68, and the nearest pole piece 28 in reaction rail 26. The magnetic reluctance of this circuit is due primarily to the inclusion of target gaps 68 and is a function of the magnetic permeability of the air in the gaps 68 and the length of the gaps 68. As will be appreciated, because the length of the target gaps 68 may vary substantially, both as the assembly 66 passes between pole pieces 28 and as the operation of vehicle 14 changes, the magnetic reluctance of the target circuit T also varies significantly.

To obtain information characteristic of the operating status of the reference and target magnetic circuits R and T, a plurality of Hall-effect pickups 84 are employed. Briefly reviewing the theory of operation of such pickups 84, they are basically formed of a material that produces an electric potential in response to an applied magnetic field and electric current. More particularly, the material produces an electric potential along a first axis in response to an electric current applied along a second axis and a magnetic field applied along a third axis, with all three axes being perpendicular to one another. The electric potential produced depends not only on the dimensions of the pickup and the characteristics of the semiconducting material employed, it also varies linearly with changes in the applied magnetic field or electric current.

As shown in the arrangement depicted in FIGS. 3 and 4, four Hall-effect pickups 88, 90, 92, and 94 are equally spaced across the upper surface of one of the two pickup-mounting plates 82 while a fifth pickup 96 is centered on the inwardly projecting end of one of the two horizontal arms 80. Thus, with constant electric currents applied to all five pickups 88, 90, 92, 94, and 96, the pickup 96 located adjacent reference gap 70 produces an electric potential or output signal that is proportional to the magnetic field traversing reference gap 70. Similarly, the pickups 88, 90, 92, and 94 spaced across the plate 82 produce electric potentials corresponding to the magnetic field strength at their respective locations. As will be appreciated, the number and location of these various pickups 84 can be varied as desired.

Hall-effect pickups 84 are widely available in a variety of constructions from numerous sources, and devices manufactured by Texas Instruments under the part designation TL173C represent one suitable embodiment. The pickups 84 may be conveniently adhered in place and the input leads, through which stimulative electric current is applied, and output leads, through which the developed Hall-effect potential is made available, attached to a common array terminal block 86 located on baseplate 72, if desired.

Returning briefly to a discussion of array 64, while the number of sensor assemblies 66 employed in the array 64 may be varied as desired, in the preferred arrangement, array 64 includes four sensor assemblies 66 whose magnets 74 are spaced apart in the direction of relative motion between vehicle 14 and guideway 16 by one-fourth the pole length of reaction rail 26. This ensures that at least one assembly 66 is always completely "shaded" by an adjacent pole piece 28, simplifying the gap and distance computations produced by control system 20 as described below.

A number of other permutations in the construction of array 64 can also be employed. For example, a plurality of Hall-effect pickups 84 could be employed on both mounting plates 82 of each sensor assembly 66. It has been found, however, that by placing the target gap pickups 88, 90, 92, and 94 on a single mounting plate 82 of a particular assembly 66, while reversing the orientation of alternating assemblies 66 in array 64, gap information from both sides of array 64 is made repetitively available without requiring an undue multiplication of the number of pickups 84 required. As shown in FIG. 3, alternating sensor assemblies 66 in array 64 may also be laterally aligned in a staggered relationship to obtain gap information from varying locations across the width of array 64. This staggered relationship further provides a substantially continual line of pickups 84 spaced equally apart in the "longitudinal" direction of vehicle travel, while introducing a minimum of magnetic coupling therebetween.

As will be appreciated, a plurality of arrays 64, constructed in the preceding manner, can be employed in sensing system 12. For example, it will typically be desirable to include both a forward array 64 and an aft array 64 to allow information concerning "pitch" (i.e., the forward or aft tilt of vehicle 14) to be more easily discerned. In some instances, it may further be desirable to include an additional array 64 midway between the two ends of vehicle 14. To monitor "roll" (i.e., the lateral tilt of vehicle 14), it may be desirable to employ a plurality of arrays 64 spaced apart laterally. As suggested above, however, in the arrangement shown in FIG. 3, a single array 64 can provide information concerning both the lateral and longitudinal variation in gap.

Turning now to a discussion of the vehicle control system 20, system 20 performs two primary functions of interest. First, system 20 processes the raw data from the various sensor assemblies 66 to provide "compensated" information concerning the gap between, and relative position of, vehicle 14 and guideway 16 that is independent of the operational characteristics of particular sensor assemblies 66. Second, system 20 processes the information regarding gap and relative position to control the operational characteristics of vehicle 14 including its position, velocity, acceleration, pitch, and roll and the gap between vehicle 14 and guideway 16.

Addressing these functions in order, the production of compensated or corrected gap and displacement information is first reviewed. As will be appreciated, the Hall-effect potentials produced by the various pickups 84 in a given sensor assembly 66 is a function of a number of factors other than gap and relative position. For example, because the Hall-effect potential produced by a pickup 84 depends on the strength of the magnetic field applied to the pickup 84, variations in the magnetomotive force available from a particular permanent magnet 74 may influence the signal produced by that sensor assembly 66. Similarly, variations in the magnetomotive force available from permanent magnets 74 in adjacent assemblies 66 of array 64 may influence the interpretation of the array's output. Further, because the gain of pickups 84 is partially a function of their temperature, temperature variations at an individual pickup 84 or across the array 64 could undesirably influence the signals produced by pickups 84 at a particular magnetic field intensity.

Figure 5:
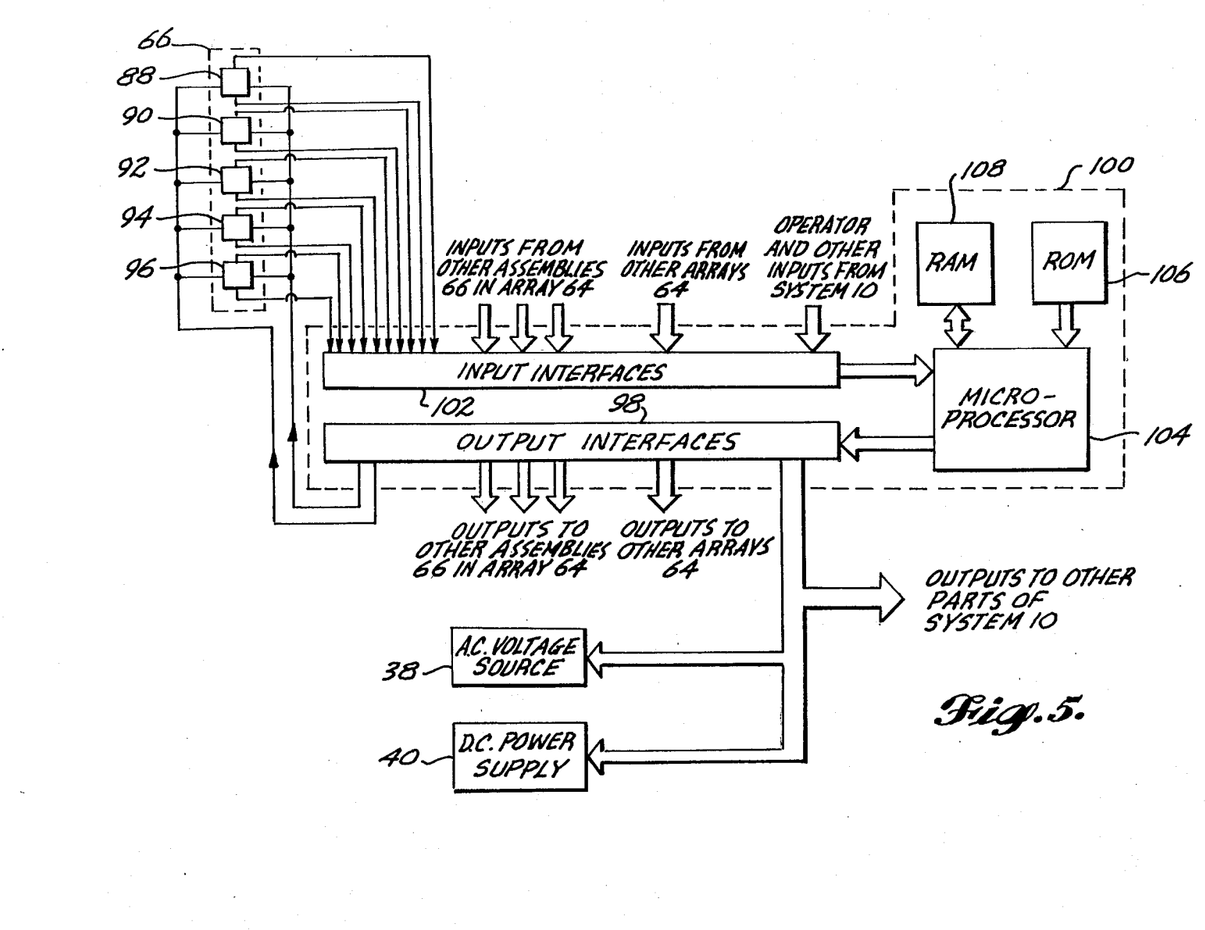
FIG. 5 is a block diagram of the various components of the sensing system employed by the vehicle to measure the gap between, and relative position of, the vehicle and roadway.

Addressing the manner in which such variables are eliminated from the output of a given sensor assembly 66, reference is had to the block diagram of systems 12 and 20 illustrated in FIG. 5. As shown, all five pickups 88, 90, 92, 94, and 96 of each sensor assembly 66 receive a controlled electric current from an output interface 98 of a microcomputer 100. The electric potentials developed by these various pickups are applied to an input interface 102 of the microcomputer 100. As will be appreciated, input interface 102 provides the amplification, analog-to-digital (A/D) conversion, and buffering required to place the output of pickups 88, 90, 92, 94, and 96 in a form appropriate for processing by a microprocessor 104 included in microcomputer 100. Similarly, the output interface 98 conditions the signals produced by microprocessor 104 to place them in a form suitable for use by control system 10. As discussed in greater detail below, microprocessor 104 operates upon the information received from input interface 102 and provides the desired outputs to output interface 98 in accordance with a series of instructions stored in a read-only memory (ROM) 106. To assist microprocessor 104 in completing this task, a random-access memory (RAM) 108 is included to, for example, store data during processing.

Turning speciifically to the manner in which microcomputer 100 processes information from each sensor assembly 66 to provide corrected data concerning gap and relative position, in a preferred arrangement the signals from the four target gap pickups 88, 90, 92, and 94 are first summed to produce a summed target signal. As will be appreciated from the description of the additional processing provided below, the use of such a summed target signal reduces the influence that any single pickup 84 has on the output of system 20. Pursuant to further instructions stored in ROM 106, microprocessor 104 then divides this summed target signal by the reference signal output from the reference gap pickup 96. In this manner, a single resultant signal is produced for sensor assembly 66 and stored in RAM 108.

While it is the information produced by target gap pickups 88, 90, 92, and 94 that is of primary interest in determining both gap and displacement, the division of the summed target signal by the reference signal provides a "corrected" version of the information produced by these pickups. More particularly, because the magnetomotive force of magnet 74 affects the magnetic field intensity in both the target gap 68 and the reference gap 70, division of the summed target signal by the reference signal effectively eliminates the influence that variations in the magnetomotive force of magnet 74 might otherwise have on the resultant assembly signal. Similarly, assuming that the pickups 88, 90, 92, 94, and 96 are subject to roughly the same temperature variations, division of the summed target signal by the reference signal eliminates the influence that such temperature variations would have on the resultant assembly signal if information from only the target gap pickups 88, 90, 92, and 94 were employed.

Turning now to a description of the manner in which the "corrected" resultant signals from the various sensor assemblies 66 are used to determine the gap between, and relative position of, vehicle 14 and guideway 16, as will be appreciated, this process requires some initial calibration of the corrected resultant signals. Specifically, some correspondence between the output of a particular assembly 66 and a known gap between the assembly 66 and an adjacent pole piece 28 must be established. For example, the various components in the target and reference magnetic loops T and R could be precisely constructed to produce a set of predetermined corrected resultant signals for assembly 66 when the upper surface of each mounting plate 82 is disposed a corresponding set of predetermined distances (i.e., gaps) below the lower surface of an adjacent pole piece 28. The correlation between gap and corrected resultant signal can then be stored in RAM 106 as a single calibration look-up table, equally applicable to each assembly 66 in each array 64.

In an alternative arrangement, greater flexibility is introduced into the construction of sensor assemblies 66 by first producing each sensor assembly 66 in accordance with relatively broadly toleranced manufacturing specifications. A separate calibration look-up table must, however, then be developed for each sensor assembly 66, correlating the corrected resultant signal produced by the assembly 66 with known gaps between assembly 66 and an adjacent pole piece 28. These individual calibration look-up tables are then separately identified and stored in ROM 106 for analysis by microprocessor 104 as outlined below.

Turning now to a discussion of the manner in which the corrected resultant signals are used to determine gap and relative position, a description is first provided of the gap determination. As will be appreciated, when the vehicle 14 moves along guideway 16 a particular sensor assembly 66 traverses alternating regions of the reaction rail 26 including pole pieces 28 and, for example, air spaces. The number of lines of magnetic flux passing through each of the target gap pickups 88, 90, 92, and 94 will be at a maximum when assembly 66 is "shaded" by an adjacent pole piece 28 (i.e., longitudinally aligned with the pole piece 28 such that the pole piece 28 extends longitudinally forward and aft of assembly 66) because the reluctance of the magnetic target loop T will be at a minimum, for a particular spacing of stator assembly 36 and reaction rail 26. When assembly 66 emerges from this shaded position, however, the fringing effects and high reluctance attributable to the spacing between pole pieces 28 reduce the number of lines of flux passing through a particular pickup 84, reducing its output. Thus, to accurately measure the length of the target gap 68, microprocessor 104 must not only compare the corrected resultant signal of assembly 66 with the calibration data stored in ROM 106, it must further monitor the corrected resultant signal to identify a maximum signal corresponding to the minimum spacing between mounting plates 82 and a shading pole piece 28, i.e., the target gap 68.

As will be appreciated, a variety of techniques can be employed in the determination of this maximum amplitude of the corrected resultant signal. For example, in accordance with instructions stored in ROM 106, microprocessor 104 may continually monitor the corrected resultant signal data stored in RAM 108, producing a "flag" when the data remains stable (i.e., varies by less than some predetermined amount over some predetermined interval of time) following an interval in which its magnitude was increasing. As will be appreciated, the interval during which the magnitude of the corrected resultant signal data is increasing corresponds to movement of the sensor assembly 66 from a region between pole pieces 28 to a position shaded by a pole piece 28. Thus, the stable interval flagged by microprocessor 104, as outlined above, will occur when the assembly 66 is shaded by an adjacent pole piece 28. As a result, microprocessor 104 will not erroneously interpret any "stable" corrected resultant signal that may occur when the assembly 66 is between pole pieces 28 as being indicative of target gap 68 length.

The preceding technique can be continuously employed for each of the four sensor assemblies 66 in each array 64. Because the longitudinal spacing of the assemblies 66 is such that at least one of the assemblies 66 is always shaded by a pole piece 28, the corrected resultant signal data for at least one of the assemblies 66 will likewise be at the stable interval flagged by microprocessor 104. The microprocessor 104 simply compares this stable, corrected resultant signal data with the calibration look-up table data stored in ROM 106 to determine the corresponding gap length. This information is then stored in RAM 108.

An alternative method of computing gap length also takes advantage of the fact that at least one of the assemblies 66 is shaded by a pole piece 28 at any given time. Specifically, the corrected resultant signal data for each of the four sensor assemblies 66 in array 64 is continually compared by microprocessor 104. Because the assembly 66 immediately adjacent a pole piece 28 will produce the corrected resultant signal data having the largest amplitude, the data corresponding to any one of the four assemblies 66 having the largest amplitude at any given time will be indicative of the length of target gap 68 when compared to the calibration look-up table data stored in ROM 106. Regardless of which of the preceding approaches is taken, the target gap information produced by microprocessor 104 and stored in RAM 108 can be averaged over a predetermined number of pole pieces 28 traversed by vehicle 14 or over some predetermined interval of time, if desired.

As with the gap determination techniques discussed above, numerous approaches can be used to determine the relative position of vehicle 14 and guideway 16. For example, in a first arrangement, microprocessor 104 continuously monitors the corrected resultant signal data stored in RAM 108 during execution of the instructions leading to the flagging of stable intervals, as discussed above. Given the equal spacing of the four sensor assemblies 66 in one array 64 over a distance of one pole, by monitoring this data in RAM 108, microprocessor 104 is able to determine the longitudinal relationship of the array 64 with respect to consecutive pole pieces 28 to an accuracy of at least one-fourth of one pole length, without requiring the retention of historical data in RAM 108 or the use of interpolation. More particularly, each time the corrected resultant signal data from an assembly 66 is flagged by microprocessor 104 as being stable, the corresponding assembly 66 is longitudinally aligned somewhere less than or equal to one-quarter pole length from the center of the adjacent pole piece 28. By "counting" the number of recurrences of stable data for a single assembly, the number of pole pieces 28 that have been traversed can be determined and the data from all four assemblies 66 can be monitored to provide an accuracy of one-quarter pole length. With microprocessor 104 initialized with information regarding the relative position of stator assembly 36 and reaction rail 26 at startup, the number of pole pieces traversed can be added to the initial position to determine current vehicle 14 position to within one-quarter pole length. In addition, by storing this "position" computation in RAM 108 along with elapsed time data, velocity and acceleration can easily be computed as the time rate of change of position and velocity, respectively.

If greater accuracy in the determination of relative position is required, a historical profile of the corrected resultant signal data corresponding to each sensor assembly 66 is retained by microprocessor 104 in RAM 108. As will be appreciated, the data for each assembly 66 exhibits a periodic pattern and the data for adjacent assemblies 66 exhibits periodic patterns that are effectively shifted in time. The "peak" portions of this periodic data correspond to the stable data flagged by microprocessor 104. If the flagged data remains stable for some time $t_1$, then the assembly 66 is most nearly aligned with the center of the adjacent pole piece 28 at some time $t_1/2$. Microprocessor 104 can identify this point on currently produced data, in real time, by interpolation, using information concerning the historical periodic pattern data stored in RAM 108 along with the current velocity of vehicle 14. As a result, accuracy is improved. The information from each of the assemblies 66 in array 64 can further be averaged continuously to provide a real-time estimate of position, or averaged over an interval of time to provide a periodic update of vehicle position.

As noted previously, control system 20 can be used to control the operation of system 10 in response to information received, in part, from the sensing system 12. For example, with the position, velocity, and acceleration of vehicle 14 determined by microprocessor 104 in the manner discussed above, a desired change in any of these parameters can easily be effected by an operator of vehicle 14. Taking velocity as an example, if the vehicle 14 is traveling at 20 kilometers per hour and the operator wishes to double the speed, an input is provided to microprocessor 104 through interface 102 initializing a speed adjustment routine stored in ROM 106. Specifically, this routine causes microprocessor 104 to retrieve the information regarding the current speed of vehicle 14 from RAM 108 and compute the change in the frequency of the AC voltage source 38 required to produce the desired speed adjustment in accordance with a look-up table or set of coefficients correlating frequency and speed, previously stored in RAM 108. Microprocessor 104 then applies an output via interface 98 to the output source 38 producing the frequency change required in the output applied to the AC propulsion coils 60.

As will be appreciated, braking of vehicle 14 occurs in the reverse manner. Further, because position and acceleration are related to velocity by time, velocity corrections performed in the preceding manner can be used by microprocessor 104 to correct position and acceleration in accordance with feedback obtained from system 12.

In addition to controlling factors relating to the longitudinal relationship of vehicle 14 and guideway 16, system 20 also provides control over the relative spacing of vehicle 14 and guideway 16. For example, microprocessor 104 is able to maintain a desired spacing of vehicle 14 and guideway 16 substantially independently of loading. More particularly, once vehicle 14 is loaded, microprocessor 104 computes the length of target gap 68 in the manner described above. With the desired gap length input to microprocessor 104 via interface 102, the gap length difference is computed and stored by microprocessor 104 in RAM 108. In accordance with further instructions stored in ROM 106, microprocessor 104 then produces an output signal to interface 98 that is applied to DC power supply 40. This signal adjusts the power applied to the field control coils 58, adjusting the suspension provided by the field of the permanent magnets 50. With microprocessor 104 continually updating the length of target gap 68, this process continues until the target gap 68 reaches the desired length input by by the operator. Alternatively, empirical data correlating the change in the output of power supply 40 required to produce a desired incremental change in the length of target gap 68 can be used by microprocessor 104 to initiate the desired change in gap length without requiring continuous feedback.

With sensor assemblies 66 positioned at various points with respect to vehicle 14, a disparity in the target gap 68 length from side to side (i.e., roll) or fore to aft (i.e., pitch) of vehicle 14 can be monitored. With separate DC field control coils 58 positioned adjacent forward and aft, as well as side, regions of vehicle 14, any such roll or pitch identified by microprocessor 104 can then be corrected in accordance with instructions discussed above by providing gap adjustments to limited sections of vehicle 14.

Those skilled in the art will recoginize that the embodiments of the invention discussed herein are exemplary in nature and that various changes can be made therein without departing from the scope and the spirit of the invention. In this regard, and as was previously mentioned, the invention is readily embodied with a variety of different types of transportation systems. Further, it will be recognized that the number of sensor arrays, assemblies in an array, pickups in an assembly, and relative arrangement of these components can be varied as desired. It will also be recognized that the information produced from these components can be combined in a variety of ways to produce outputs useful in the control of the transportation system. In addition, although the lateral motion of the vehicle is limited by the guideway in the arrangement discussed above, in an arrangement in which the vehicle is free to undergo three degrees of motion, additional sensor assemblies and arrays could be included to monitor the relative position of the vehicle laterally with respect to the guideway. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A sensor for use in monitoring the gap between, and relative position of, first and second elements that are movable relative to each other, the first element defining a path of relative motion that includes consecutive regions whose magnetic permeabilities are alternately at first and second levels, said sensor comprising:
   a sensor element, securable to the second element, for producing data having a magnitude that varies in part with the magnetic permeability of the region of the first element adjacent said sensor element as the first and second elements undergo relative motion; and
   processing means for monitoring said data and producing an output indicative of the gap, based upon information obtained from said data produced when the region adjacent said sensor element has a magnetic permeability equivalent to the first level, and an output indicative of relative position, based upon information obtained from said data produced when consecutive ones of the regions are adjacent said sensor element.

2. The sensor of claim 1, wherein the first element includes a plurality of discrete pole pieces separated by regions of nonferrous material, the pole pieces and the regions of nonferrous material defining the consecutive regions of the first element, the pole pieces having a relatively high magnetic permeability equal to the first level and the regions of nonferrous material having a relatively low magnetic permeability equal to the second level.

3. The sensor of claim 2, further comprising a plurality of said sensor elements securable to the second element at spacings sufficient to ensure that at least one of said sensor elements is adjacent at least one of the pole pieces for any said relative position of the first and second elements.

4. The sensor of claim 1, wherein said sensor element further comprises:
   a source of magnetic energy;
   means, coupled to said source of magnetic energy, for defining a first magnetic circuit including said source, the region of the first element adjacent said sensor element and the gap between the first and second elements; and
   means coupled to said source of magnetic energy, for defining a second magnetic circuit including said source and a reference gap.

5. The sensor of claim 4, wherein said sensor further comprises:
   means for producing a first gap signal proportional to the magnetic flux concentrated in the gap between the first and second elements, said first gap signal being said output indicative of said gap;
   means for producing a second gap signal proportional to the magnetic flux concentrated in said reference gap;
   means for comparing said first and second gap signals to remove the effect of certain parameters upon said output indicative of said gap.

6. The sensor of claim 5, wherein said certain parameters are the temperature of said sensor element and the magnetic energy produced by said source.

7. The sensor of claim 4, wherein said means for producing said first and second gap signals comprises Hall-effect pickups.

8. The sensor of claim 4, wherein said data comprises a periodic signal.

9. A method of determining the orientation of first and second relatively movable and noncontacting elements, the first element including regions of varying magnetic permeability, which alternate between first and second levels, the second element having at least one defined sensing region, said method comprising the steps of:
   producing an output indicative of the magnetic permeability of the region of the first element that the sensing region of the second element is adjacent;
   monitoring said output for a first characteristic indicative of a first component of the orientation of the first and second elements;
   monitoring said output for a second characteristic indicative of a second component of the orientation of the first and second elements; and
   producing a determination of said orientation based upon said first and second characteristics.

10. The method of claim 9, wherein the first characteristic of said output occurs when the magnetic permeability is at the first level and wherein the first component of orientation is the spacing between the first and second elements in a direction normal to that of relative motion.

11. The method of claim 10, wherein the second characteristic of said output is representative of the variation in said output produced when the sensing region of the second element is moved past consecutive regions of the second element and wherein the second component of orientation is the relative position of the first and second elements in a direction parallel to that of relative motion.

* * * * *